J. T. AUSTIN.
COMBINATION ORGAN STOP ACTION.
APPLICATION FILED NOV. 18, 1915.

1,279,492.

Patented Sept. 24, 1918.
5 SHEETS—SHEET 1.

Witnesses
Otto Hilton.
L. L. Markel.

Inventor
John T. Austin
By
Attorney

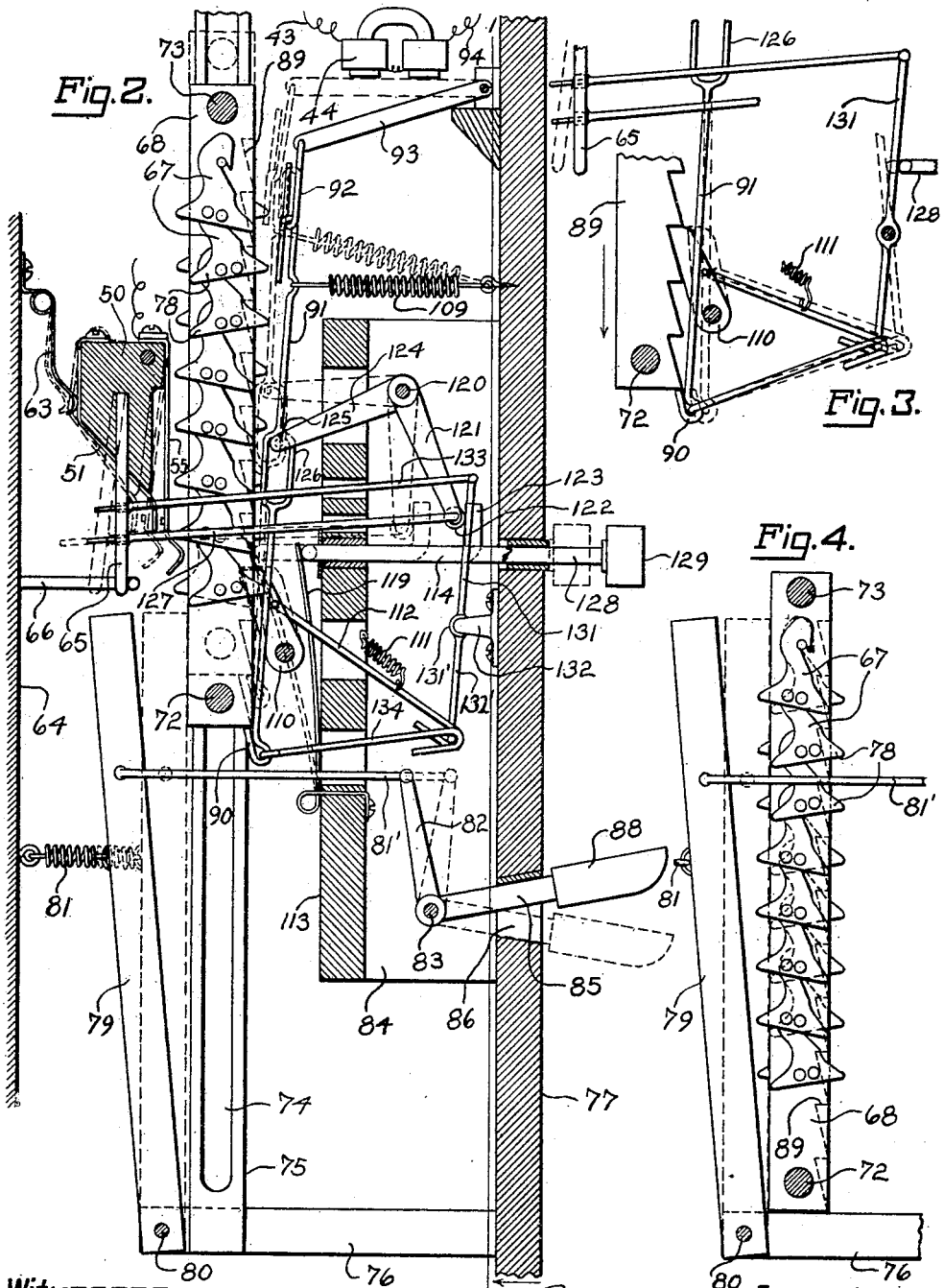

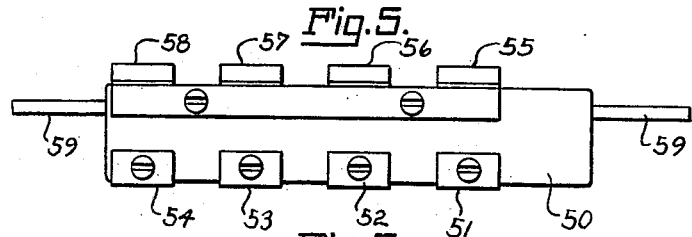
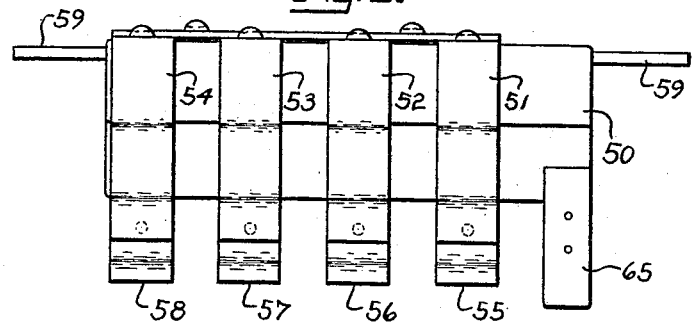
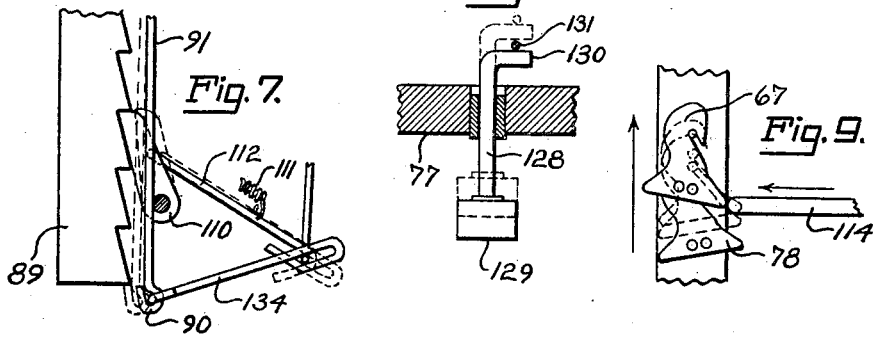
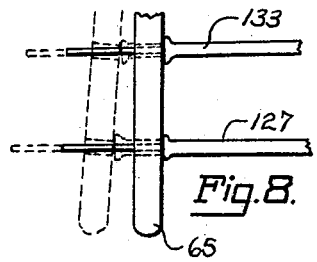
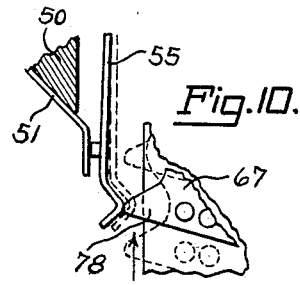

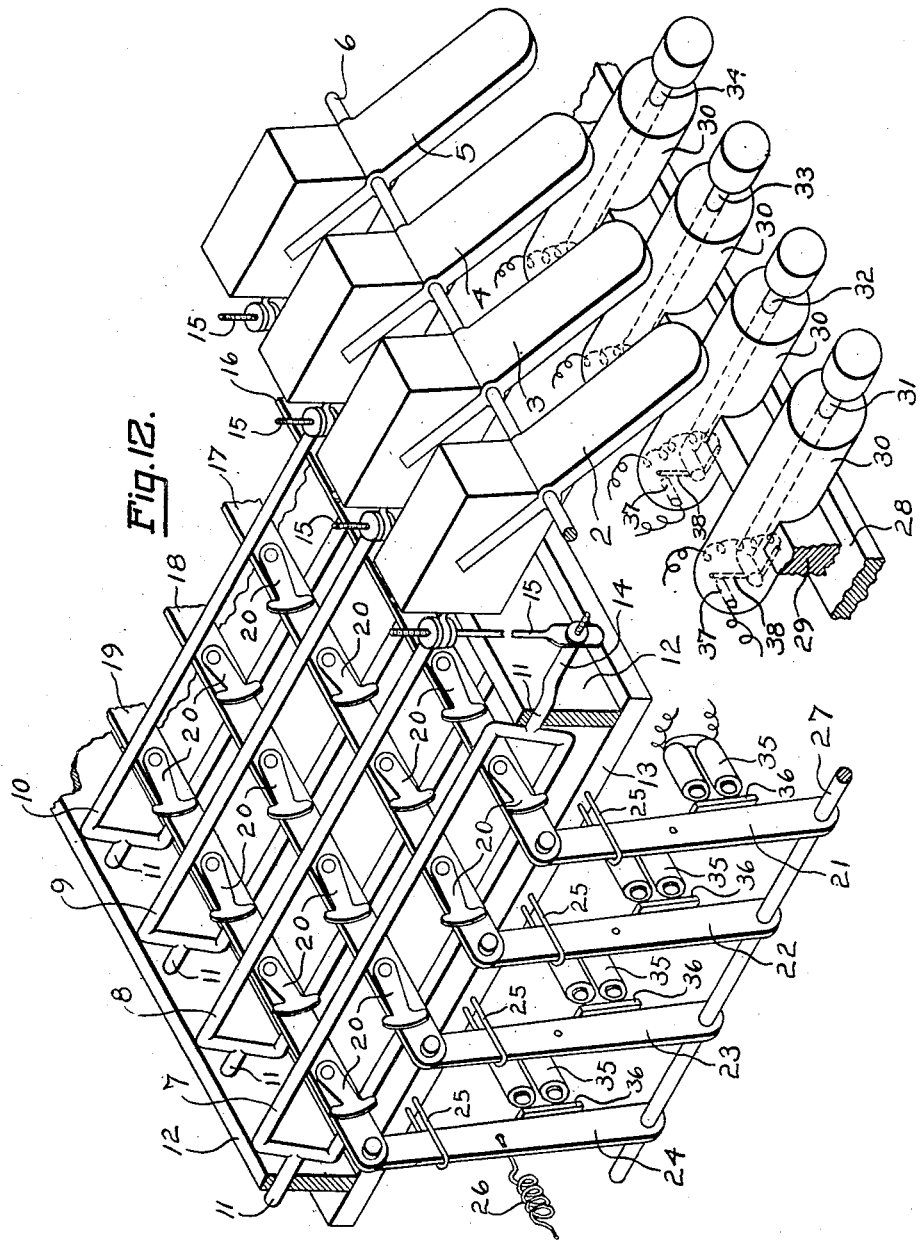

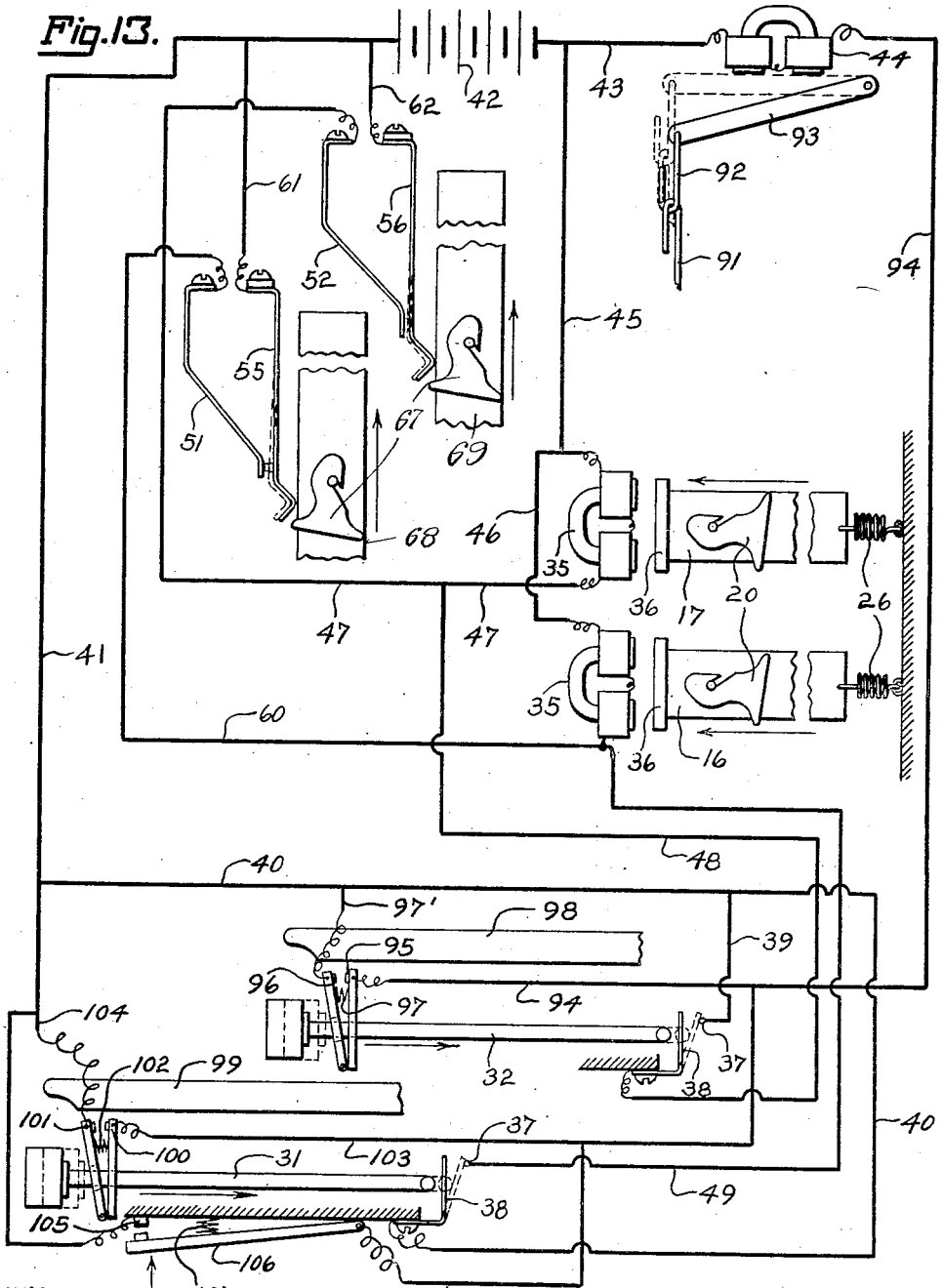

UNITED STATES PATENT OFFICE.

JOHN T. AUSTIN, OF HARTFORD, CONNECTICUT, ASSIGNOR TO AUSTIN ORGAN COMPANY, OF HARTFORD, CONNECTICUT, A CORPORATION OF MAINE.

COMBINATION ORGAN-STOP ACTION.

1,279,492.     Specification of Letters Patent.     Patented Sept. 24, 1918.

Application filed November 18, 1915. Serial No. 62,214.

*To all whom it may concern:*

Be it known that I, JOHN T. AUSTIN, a citizen of the United States, residing at Hartford, in the county of Hartford and State of Connecticut, have invented certain new and useful Improvements in Combination Organ-Stop Actions, of which the following is a specification.

This invention relates to combination organ stop actions, the object of the invention being to provide means by which combinations of organ stops may be operated in different orders.

In the drawings accompanying and forming part of the present specification I have shown in detail one of the several forms of embodiment of the invention which to enable those skilled in the art to practice the same will be fully set forth in the following description. I do not restrict myself to this showing; I may depart radically therefrom in several respects within the scope of the invention defined by my claims.

Referring to said drawings:

Fig. 2 is a vertical section of the same on the line 2—2 of Fig. 1, looking in the direction of the arrows.

Fig. 3 is a detail view partly in section, of pawl and rack means and certain coöperating parts hereinafter more particularly described.

Fig. 4 is a similar view of means by which the combinations can be operated in different orders and also shows a means for returning the actuators to their original positions.

Fig. 5 is a top plan view of a tilting rail, its contacts and supporting shaft, and, Fig. 6 is a rear view of the same.

Fig. 7 is a detail view of the pawl and rack means shown in Fig. 3, with the detent and pawl shown in their holding and releasing positions by full and dotted lines respectively.

Fig. 8 is a similar view of means for shifting the contact supporting rail.

Fig. 9 is also a detail view illustrative of a device for setting an actuator or actuators.

Fig. 10 is a like view showing the operation of an actuator against a contact.

Fig. 11 is a horizontal section on the line 11—11 of Fig. 1 of a releasing button and associated parts.

Fig. 12 is a perspective view of part of the combination mechanism showing the rollers, traces, stop keys, plungers and certain adjunctive parts.

Fig. 13 is a diagram of certain electrical and other connections.

Like characters refer to like parts throughout the several views which are on different scales.

Figure 1:
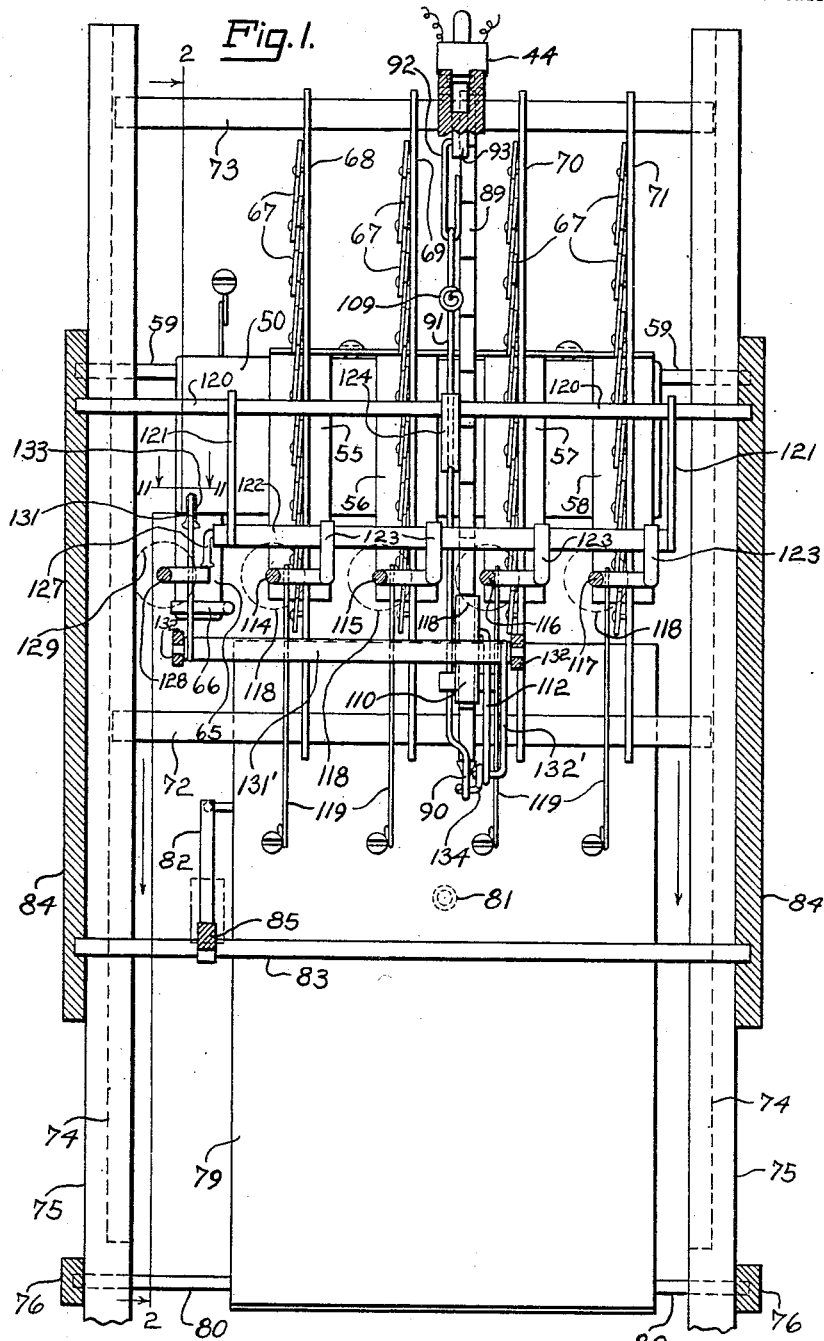
Figure 1 is a front elevation partly in section, the section being on the line 1—1 of Fig. 2, looking in the direction of the arrow, of a combination organ stop action involving the invention.

It is old in the organ art to provide means by which several stops to constitute a combination, may be simultaneously operated. Let it be supposed that there are a given number of combinational possibilities of stops, each combination of stops being operated from what might be considered a combination-operating element. When, therefore, one of these elements is operated, one combination of stops is caused to act. When another element is operated, another combination is caused to act and so on. There may be as will be understood, any desired number of these combination-operating elements in my present construction. While I do not restrict myself to the use of any particular means whereby stops may be simultaneously operated in combination with each other through the intervention of an operating element or otherwise, nevertheless Patent No. 1,078,079 issued to me November 11, 1913, shows an organization suitable for the purpose. I provide, as will be obvious, means settable or changeable at will by which the action of these combinations may be secured in different orders. For example, a piece of music might demand in one measure the playing of combination one and then combination three, while a second measure in the same piece of music might require combinations one, two, three and four in sequence, while farther on it might be necessary to effect the action of combinations two and one, or it might be four and one. These are merely several of a large number of illustrations. In the present disclosure means are provided for effecting the action of only four different combinations, but as already noted, their number is not an essential consideration.

Referring to Fig. 12 I have shown four stop keys 2, 3, 4 and 5 supported for individual or independent movement by the relatively stationary shaft 6. Between each of these stop keys and the coöperative stop is arranged mechanism by which when the stop key is depressed, the stop governed thereby will be operated. This mechanism may be of any suitable nature; that shown involves in its make-up what is known as a "roller." There are four of such rollers 7, 8, 9 and 10 consisting of skeleton or open rockers of practically rectangular form, the outwardly extending coaxial pivots 11 of which project through openings in the parallel bearings or strips 12 mounted on and rising from the board 13. The forward pivots have crank portions 14 connected respectively by links 15 with the rear part of the bodies of the several keys 2, 3, 4 and 5. It will, therefore be evident that when the finger portion of one of these keys is depressed and then elevated, the roller associated therewith will be given a full oscillation. All the stop keys and the rollers are shown as off in said Fig. 12. When a stop key, however, is depressed, the roller through the intermediate parts will be turned from off to on to effect a corresponding action of the stop associated therewith. The connections between the respective rollers and stops are not shown. They may be of any of the kinds common in this art.

Extending through the rollers 7, 8, 9 and 10 are what are known as "traces" as 16, 17, 18 and 19. These traces with their associated actuators 20 constitute suitable combination-operating elements. The actuators 20 are pivoted to the traces in such manner that the portions of their T-heads can be adjusted above or below the respective traces for a reason that will hereinafter appear. In Fig. 12 some of the T-heads are extended above the upper edges of the traces, while the remainder of the T-heads are extended below the lower edges of said traces. To the rear ends of the traces 16, 17, 18 and 19 the rock arms 21, 22, 23 and 24 are pivotally connected, these arms being confined within guide staples as 25 projecting from the board 13 and being held in their retracted positions by springs as 26 connected therewith, only one of such springs, however, being shown. The arms 21, 22, 23 and 24 are supported for independent rocking motion by the stationary shaft 27. The foregoing is a concise description of part of the combination mechanism set forth in my prior Letters Patent to which I have already referred. In said Letters Patent I show pistons or plungers by which traces 16, 17, 18 and 19 can be operated and by which in conjunction with stop keys such as 2, 3, 4 and 5 combinations can be made. In the Letters Patent mentioned the plungers are mechanically connected with rock arms as 21, 22, 23 and 24.

In the present case while the plungers are utilized for effecting the necessary movement of said rock arms the action is electrical. Disposed in front of the several rock arms, traces and rollers is a cross piece 28 carrying the strip 29 apertured to rigidly receive the cases 30 for the plungers 31, 32, 33 and 34. In Fig. 13 I have shown two of the plungers which will be assumed to be the plungers 31 and 32, and I have also illustrated the coöperating traces 16 and 17. With the four traces are associated magnets as 35, these magnets when energized serving to attract their armatures 36 on the coöperating rock arms 21, 22, 23 and 24 to advance said rock arms and necessarily to advance the traces, the advancing movement of the rock arms and traces being in Fig. 12 toward the right. In Fig. 13 the advancing movement of the traces is toward the left. In conjunction with each of the four pistons or plungers 31, 32, 33 and 34 is a fixed contact as 37 and a spring contact as 38, each spring contact being in the path of movement of its coöperating plunger so that when the latter is advanced the requisite extent said spring contact will be moved against the fixed contact as shown by dotted lines in Fig. 13 to effect as will hereinafter appear, the energization of the corresponding magnet 35. Normally, as will be clear, the pistons 32 are out, at which time the spring contacts 38 occupy the full line positions in Fig. 13. From what is shown as the upper fixed contact in Fig. 13 the wire 39 extends and is connected with the wire 40 which runs from the lower spring contact 38 to the wire 41 connected to one pole of the battery 42 constituting a suitable source of electrical energy. From the other pole of the battery the wire 43 extends and is connected to one terminal of the magnet 44, the function of which will be hereinafter stated. The wire 45 extends from the wire 43 and is connected in turn to the wire 46 bridging like terminals of the two magnets 35 to which I have already referred. From what is shown as the lower terminal of the upper magnet 35 the wire 47 extends, while the wire 48 connected at one end to the wire 47 leads to the upper spring contact 38. From the lower fixed contact 37 the wire 49 extends and is connected with the lower terminal of the lower magnet 35. It will, therefore, be clear that if the plunger or piston 31 be moved from the full line position in Fig. 13 to the dotted line position, the end of the plunger will force the spring contact 38 coöperative therewith against the adjacent fixed contact 37 to effect the energization of the lower magnet 35 and thereby cause the magnet to attract its armature 36 on the coöperating trace 16. On the retraction of the plunger 31 to the full line position, either by hand or by the use of a spring (not shown) sufficiently to permit the coöperating contact to spring free of the fixed contact 37, the lower magnet 35 will be deënergized so that the spring 26 connected with the trace 16 can retract the same. When the plunger 32 is pushed in the upper magnet 35 will be energized through the connections described so as to advance the trace 17, and when the said upper magnet is deënergized the spring 26 connected with said trace 17 will return said trace to its primary position. I have shown by arrows the direction of advancing movement of the two plungers and traces. As will be evident any desired number of plungers and traces may be provided. As in the construction illustrated only four combinations are possible, there are only four plungers and pistons and hence a corresponding number of traces. I have shown this small number primarily for simplicity. As thus far described, the action is exactly like that fully described in my prior Letters Patent mentioned except that as already noted I provide for the advancing movement of the traces 16, 17, 18 and 19 by electrical means instead of by mechanical connections with the four plungers 31, 32, 33 and 34. The combinations are made exactly as shown in said patent; that is solely through the joint action of a trace and a corresponding plunger in connection with the stop keys 2, 3, 4, and 5. A combination is, therefore, made by moving in a plunger and then depressing the necessary keys, the combinations being settable at will. All the rollers 7, 8, 9, and 10 are shown as being in their inoperative or ineffective positions in Fig. 12. By swinging them over so that their upper cross bars move toward the foreground in Fig. 12 and the lower cross bars toward the background in said view, said rollers will be moved from inoperative to operative positions so as to effect the action of the stops associated therewith. It will be understood therefore, that by the thrusting of one of the four plungers 31, 32, 33 and 34 two, three or four of the traces 16, 17, 18 and 19 will be advanced so that the actuators 20 thereon can move the rollers which are in the combination from off or inoperative position to on or effective position and thus secure a corresponding action of the stops connected with the rollers thus moved. There will be associated with the stop keys 2, 3, 4 and 5 means for elevating them in the manner shown in my prior Letters Patent, and this means will also return the rollers from on to off. It will be obvious that the foregoing is merely one way of making combinations. It will also be understood that I provide organ stop operating mechanism and means located to be set by said mechanism in position to actuate said mechanism. Each organ stop operating mechanism has a movably mounted member such as a trace provided with a shiftable part such as an actuator located to be set by said mechanism in position to actuate said mechanism. Each trace is, therefore, a stop combination operating element. In conjunction with the combination operating mechanisms or associated with the traces are means settable at will for effecting the action of said mechanisms or traces in different orders, and when this means is used it is not necessary to have recourse to the plungers 31, 32, 33 or 34 or their equivalents, although as will be clear the combinations may be individually or singly played at any time through the intervention of the plungers or analogous parts. The means by which the combinations may be played in different orders under the control of the organist may vary radically, although one form is shown and will now be described.

Within the case of the organ is mounted a rail as 50 which constitutes a suitable support for contacts, there being (Figs. 2, 5, 6 and 13) four relatively fixed contacts 51, 52, 53 and 54 and four movable contacts 55, 56, 57 and 58, the contact 55 being coöperative with the contact 51, the contact 56 being coöperative with the contact 52, etc. These contacts are connected to and depend from the rail 50, the contacts 55, 56, 57 and 58 being resilient. The rail 50 in the present instance is supported for oscillation by the fixed shaft 59 for a reason that will hereinafter appear. Each pair of contacts on the swinging rail 50 is coöperative with a trace, the contacts 51, and 55 being coöperative with the trace 16, the contacts 52 and 56 being coöperative with the trace 17 and so on, the organization being such that when a pair of contacts is brought into engagement the magnet 35 controlling the advance of the appropriate trace is energized to effect the advance of said trace and thus the action of a combination of stops. Referring now to Fig. 13, it will be seen that the contact 51 is connected by the wire 60 with the lower terminal of the lower magnet 35 and that the contact 55 is connected by the wire 61 with the wire 41 which it will be remembered is connected with the battery 42. The contact 52 is connected with the wire 47 already described, while the contact 56 is connected by the wire 62 with said wire 41. Therefore, when the contact 55 is moved against the contact 51, the circuit for the lower magnet 35 is closed to energize said magnet to effect the attraction of its armature 36 and therefore the advance of the trace 16. It will also be clear that if the contact 56 be moved against the contact 52, the upper magnet 35 will be energized to effect the advance of the trace 17. The connections between the other two pairs of remaining fixed and coöperating movable contacts, magnets and traces are the same and therefore need not be described for two complete connections illustrate the operation. It will be understood that the movable contacts 55, 56, 57 and 58 are normally free or separated from their respective coöperating contacts 51, 52, 53 and 54, this being due in the present case to the resiliency of the said movable contacts.

It will be remembered that the rail 50 has been described as movably mounted, it being shown as oscillatory. The purpose of thus mounting the contact carrier or rail 50 is to shift the several movable contacts out of the path of actuators during the setting of said actuators or during the return of the carrier therefor to the primary position thereof. The rail 50, however, is normally maintained in operative relation in some suitable way as by the spring 63 bearing thereagainst, said spring being connected to the support 64 (Fig. 2). In said Fig. 2 the carrier or rail is shown as occupying its operative position in full lines, and its shifted position in dotted lines. When the carrier or rail is in its normal position the pendent projection 65 thereof is against the stop 66 extending from the support 64.

The movable contracts 55, 56, 57 and 58 are caused to engage the coöperating relatively fixed contacts 51, 52, 53 and 54 respectively by what I term actuators as 67, these actuators being carried upon traces 68, 69, 70 and 71. There are four of such traces and each of them carries eight actuators. Four traces as 68, 69, 70 and 71 are shown, because in the organization illustrated it is only possible to get four combinations. In practice a larger number of traces would be provided, but the invention does not concern the number of said traces or the number of combinations or in fact the number of actuators carried on said traces. These traces are rigidly connected at their ends by cross bars as 72 and 73 respectively, the cross bars and traces presenting a frame or carrier for the actuators to which I have just alluded. The cross bars 72 and 73 extend out beyond the traces and in the construction shown move up and down in channels or grooves as 74 in the guide strips 75 connected to and rising from the brackets 76 which extend inward from the front board 77, see for instance Figs. 1 and 2. The actuators 67 are pivotally mounted and in overlapping relation on the respective traces 68, 69, 70 and 71. Each of the actuators 67 has a transverse portion 78, the terminals of which are movable alternately across the inner and outer edges of the respective trace. The inner or toe portion of each actuator 78 constitutes the active part thereof, being adapted when moved to the rear of its trace to engage a coöperating movable contact (55, 56, 57 or 58) to move the same against its coöperative fixed contact. When the heel portion of each actuator is in front of its trace, said actuator is in position to be set by a suitable device. The trace appearing in Fig. 2 is assumed to be the trace 68. The eight actuators 67 thereof are in different positions, the first actuator being in operative position, the second and third in inoperative position, the fourth, fifth, sixth, and seventh in operative position, and the eighth in inoperative position. It will be supposed that the several traces are in their lowermost positions at which time the bar 72 rests against the bottoms of the two grooves 74. On the advance of the several traces 68, 69, 70 and 71 the motion is a step-by-step or intermittent one. It will be assumed as before that the trace 68 is elevated and that the first actuator 67 on the first step of the trace 68 engages and moves the contact 55 against the coöperating contact 51. This results in the energization of the magnet 35 connected with the first trace 16 and the advance of said trace 16 in the manner already described. On the second step upward of the trace 68 and also on the third step the second and third actuators 67 will pass free of the contact 55. On the fourth, fifth, sixth and seventh advance steps of the said trace 68, the fourth, fifth, sixth and seventh actuators 67 on said trace 68 will engage the movable contact 55 and cause the same to engage the coöperating contact 51 and hence on each of such actions advance in the manner already described the trace 16. On the eighth and last step of the trace 68 the eighth and final actuator will not strike the contact 55. The actuators of the several traces 68, 69, 70 and 71 are settable so that they can effect the action of a combination of stops. I have described the step-by-step upward movement of one trace. As this trace 68 moves upward the other three traces 69, 70 and 71 move therewith and their actuators either operate or pass free of coöperating movable contacts as 56, 57, and 58. While it is conceivable that two or even all transversely alined or horizontal rows of actuators on the traces 68, 69, 70 and 71 may be in their operative positions, this is not usual, for only one of the actuators of such a row is generally in such relation. That is to say there are eight rows of transversely extending actuators, each row involving as will be obvious four actuators and only one actuator in each row will preferably be in operative position so that as the several traces 68, 69, 70 and 71 are elevated, one actuator in the first row will close a circuit on the first upward movement of the several traces, while on the second movement an actuator in the second row will close a circuit and so on.

When the traces 68, 69, 70 and 71 are in their initial or primary position, the lower bar 72 will be against the bottoms of the two guide grooves 74 as shown in Fig. 4. Before the actuators 78 are set they should all be moved to inoperative positions, and for this purpose any suitable means may be provided, the restoring device 79 being shown for this purpose. The restoring device is shown as a flap supported for oscillation by the fixed shaft 80 extending between the brackets or arms 76, and normally held in a retracted position by the spring 81 connected therewith and to the support 64. To this restoring device or flap 79 is connected the link 81' pivoted in turn to the crank arm 82 (Fig. 2) fastened to the rock shaft 83 mounted between the side members 84, the pedal 85 being also rigid with said rock shaft, extending through the vertically elongated slot 86 in the front board 77 and the foot-piece 88 being located at the front end of the pedal or lever 85. The restoring or cancellation member 79, the foot-piece 88 and intermediate parts are shown as occupying their normal positions by full lines in Fig. 2, the foot-piece 88 being up. Fig. 4 also illustrates by full lines the restoring device or cancellation member 79 in its normal position, the lower cross bar 72 in this particular view being at the bottoms of the companion grooves 74. It is assumed that the trace showing in said Fig. 4 is that numbered 68. This trace has several of its actuators 67 in operative positions and some of them in inoperative positions. I have shown, however, the inoperative positions by dotted lines of those actuators which in full lines are in operative positions. To move all the actuators of all traces to inoperative positions, the foot-piece 88 will be swung downward to the dotted line position in Figs. 2 and 4 thereby swinging through the intermediate parts the restoring device or cancellation member 79 from the full line to the dotted line position in Figs. 2 and 4, so that said restoring device can engage all the actuators 67 that may be in operative positions to move the same simultaneously to inoperative positions. Initially the combinations are set through the joint action of the necessary stop keys 2, 3, 4 and 5 and the plungers 31, 32, 33 and 34. After this is done the frame for the actuators 67 will be lowered to the position shown in Fig. 4 at which time all of the actuators 67 will be moved to inoperative positions through the action of the restoring device or cancellation member 79 or in some other convenient way. Succeeding this action the carrier for said actuators 67 is advanced, the advancing movement in the present case being upward. On the first step of the said carrier an actuator in the first row or group will be set. Then the actuator will be given a second step movement and an actuator in the second row or group will be set. The actuator will then be given a third step and an actuator in the third row will be set, this action continuing until at least one actuator in each transverse row is set or is moved from inoperative position to operative position. The means for advancing the actuator-carrier to effect setting of the actuators, will be hereinafter described.

During playing of the organ the actuator-carrier is also given a step by step movement, any suitable means being provided for this purpose, although electrically governed pawl-and-rack means is shown. The cross bars 72 and 73 are connected by the rack 89 (Figs. 1, 2, 3, 4 and 7 for example), the pawl 90 being coöperative with said rack. This pawl 90 has an elongated shank 91 hooked into the link 92 pendant from and loosely connected with the armature 93 of the magnet 44 which I have hereinbefore described and which is shown diagrammatically in Fig. 13. The wire 43 is connected with one terminal of said magnet as already noted, the wire 94 leading from the other terminal thereof and being connected with the fixed contact 95 in the form of a plate coöperative with the pivoted contact 96 also in the form of a plate, the two contacts 95 and 96 being normally held separated in some suitable way as by the spring 97'. From the swinging contact 96 the wire 97' leads and is connected with the wire 40 already described. The piston 32 extends through the two contacts or plates 95 and 96 which are generally arranged under the keys 98. Under a second bank of keys 99 a fixed contact plate 100, the exact counterpart of the plate 95 may be arranged, and it may coöperate with a swinging contact plate 101, a duplicate of the plate 96, the spring 102 being disposed between the plates 100 and 101 to normally maintain the latter separated. From the contact 100 the wire 103 extends and leads to the wire 94 already described. From the contact 101 the wire 104 extends and is connected with the wire 41. This wire 41 it will be remembered, is connected at one end with one pole of the battery 42, being connected at its other with the fixed contact 105 coöperative with the swinging contact 106 normally held away from the contact 105 by a spring as 107. I deem it desirable to note the fact that the wires 40 and 41 constitute return wires. The wire 108 leads from the contact 106 to the wire 103 already described. When a performer desires he can move by hand either contact 96 or 101 against a coöperating contact 95 or 100 or by his knee can move the contact 106 against the contact 105, and when any one of these three movable contacts is moved against a coöperating fixed contact, the magnet 44 through the connections described is energized to attract or swing upward as shown, its armature 93. When the actuators 67 are in their lowermost positions as shown in Fig. 4, the pawl 90 will be in the first tooth space of the rack 89, being maintained in such relation in some suitable way as by the spring 109. When the magnet 44 is energized in the manner already described, the armature 93 is attracted thereby elevating the shank 91 and consequently the pawl 90, so that the pawl can advance the several actuators 67 one step or a distance equaling the length of one tooth of the rack 89 and thereby bring the first or upper row of actuators 67 opposite the movable contacts 55, 56, 57 and 58, that actuator in said upper row, which is in operative position, moving the coöperating movable contact against the adjacent fixed contact to effect the advance movement of one of the traces 16, 17, 18 and 19, and the resultant action of several stops. On the second energization of the magnet 44, a second horizontal row of actuators is brought into the same position, so that the actuator in said row which is in operative position can effect in the manner set forth the advance of a second one of said traces 16, 17, 18 and 19. This operation is continued until at least one actuator in each row has effected the operation of a combination of stops, at which point the frame for said actuators, consisting of the traces 68 to 71 inclusive and cross bars 72 and 73, is released, permitting said frame or carrier to drop until the cross bar 72 strikes the bottom of the companion grooves 74. Backward movement of the actuator carrier is prevented by a detent or dog as 110 which is snapped successively into the tooth spaces of the rack 89 by a spring as 111 connected with the link 112 and to the wall 113. This link 112, which may consist of a wire is connected with the dog or detent 110 between the ends thereof. It will be clear that after the rack 89 has been advanced, the detent or dog 110 will be moved by the spring 111 from the dotted line position in Fig. 3 to the full line or restraining position thereof in said view.

Any suitable means may be provided for setting the actuators 67 into operative positions. For this purpose I have shown the setting devices 114, 115, 116 and 117 (Fig. 1), each of said setting devices or shanks having at its front end a manipulating button 118. The setting devices or shanks project through bushed openings in the front board 77. They are normally held in their forward positions as shown by full lines in Fig. 2 by springs as 119 acting thereagainst.

Supported between the side walls 84 is the shaft 120, the arms 121 being rigid with said shaft and being connected by the cross-piece 122 disposed in the path of movement of projections, as 123, carried by the setting devices or shanks 114, 115, 116 and 117 respectively. The shaft 120 also has rigid therewith the arm 124 furnished with a projection 125 disposed in the elongated loop 126 of the shank 91 (Figs. 1 and 2). Connected with the arm 121 about coaxial with the cross-piece 122 is the rod 127 having a loose connection at its inner or rear end with the projection 65, which it will be remembered is rigid with the rail 50.

When one of the setting devices 114, 115, 116 and 117 is thrust inward to the dotted line position shown in Fig. 2, the projection 123 rigid therewith will engage the cross piece or bar 122 and will swing the same and hence the arms 121 inward to elevate through the rock shaft 120, the arm 124 which will thrust the shank 91 upward and thereby through the pawl 90 lift the several traces 68, 69, 70 and 71. As the traces rise and as the setting device moves inward, the particular actuator 67 opposite the setting device in question will be moved from inoperative to operative positions, the heel portion of the actuator riding against the inner portion of the setting device for this purpose as said traces rise. On the initial movement of the setting device thus moved inward, the link 127 through the described parts is moved rearwardly and acting against the pendent member 65 swings the rail 50 from the full line to the dotted line position, thereby carrying all the movable contacts 55, 56, 57 and 58 out of the path of effective movement of the actuators, by reason of which when an actuator is moved from inoperative to operative position by the aid of its coöperative setting device, said actuator when thus set cannot engage its coöperating movable contact. This action is repeated until at least one actuator 67 in each horizontal row is moved into operative position.

As before noted after the actuators are set and after the cross bar 72 strikes the bottoms of the transversely alined grooves 74, the several traces 68, 69, 70 and 71 are elevated through the action of the magnet 44 in the manner already described and those actuators 67 which are in operative position will strike movable contacts to effect the action of the traces 16, 17, 18 and 19 in the manner already described.

After the traces 68, 69, 70 and 71 mentioned have reached their upper positions and after the combinations are all played, the traces are released, and this action may be brought about as follows: In transverse alinement with the shanks 114, 115, 116 and 117 is a shank 128 provided with a button 129, a counterpart of the buttons 118. The shank also projects through a bushed opening in the front board 77 and has a bend 130 at its front end (Fig. 11) coöperative with the rock lever 131 (Fig. 2) fulcrumed at 131' for oscillation between its ends by the bracket 132 attached to the inner side of the front board 77. The upper end of this lever 131 is connected with the link 133 loosely connected with the projection 65. The lower end of the lever is connected with the link 112 already described and with a link as 134 jointed in turn to the pawl 90. After all the combinations have been played through the primary intervention of the actuators 67 which are in operative positions, the shank 128 will be moved in from the full line position which it is shown as occupying in Fig. 11 to the dotted line position, and during this motion the lateral extension or bend 130 will strike the upper branch of the lever 131' and through the link 133 will move the projection 65 and therefore the rail 50 from the full line to the dotted line position, thereby carrying the several movable contacts on said rail from out of the path of the actuators in operative positions, so that when said actuators descend they will not strike the movable contacts. About the time the movable contacts are moved to their ineffective positions, the links 112 and 134 will as the lower branch of the lever 131 is swung forward, cause the detent 110 and the pawl 90 to swing free of the rack 89, thereby releasing the several traces 68, 69, 70 and 71 so that said traces can drop until the bar 72 bottoms in the grooves 74. When this is done the restoring or cancellation member 79 is swung forward in the manner already described to move those actuators which are in operative position simultaneously to inoperative position.

What I claim is:

1. A combination organ stop action comprising means changeable at will for operating stops in different combinations, and means adjustable at will, for effecting the operation of the other means to secure the action of the combinations in different orders.

2. A combination organ stop action comprising elements provided with means for operating stops in combinations, and coöperating elements operable at will to adjust the stop operating means on the first mentioned elements to vary the combinations, and means adjustable at will, for operating the first mentioned elements in different orders.

3. A combination organ stop action comprising elements provided with means for operating stops in combinations and with means for individually operating said elements, and means adjustable at will for effecting the operation of said elements in various orders.

4. A combination organ stop action comprising means for individually operating combinations of stops, and means adjustable at will for operating the combinations in different orders.

5. A combination organ stop action comprising elements provided with means for operating stops in combinations, stop keys for effecting the individual action of the elements, and means adjustable at will for effecting the operation of said elements in different orders.

6. A combination organ stop action comprising elements provided with means for operating stops in combinations, stop keys, combination stop operating means, settable by the joint action of the elements and coöperative stop keys, and means adjustable at will for effecting the operation of said elements in different orders.

7. A combination organ stop action comprising elements for operating stops in combinations, a movable member provided with actuators adjustable into operative and inoperative positions, and means governed by said actuators when in the operative positions thereof, for effecting the movement of said elements on the movement of said movable member.

8. A combination organ stop action comprising a movable member, provided with actuators adjustable into operative and inoperative positions, means for operating the stops in different combinations, and means governed by said actuators when in the operative positions for effecting the operation of the combinations through said first mentioned means, in desired order.

9. A combination organ stop action comprising elements for operating stops in combinations, a movable member provided with actuators adjustable into operative and inoperative positions, means for imparting a step-by-step movement to said movable member, and means operative by an actuator at each step of said member and when said actuator is in the operative position thereof, for effecting the movement of one of said elements.

10. A combination organ stop action comprising a movable member provided with movably mounted actuators arranged in groups, means for imparting a step-by-step movement to said member and means for setting an actuator in each group at each step of said member.

11. A combination organ stop action comprising a movable member provided with transverse rows of actuators, a plurality of manually operative members, and means operative by each manually operative member for effecting a step-by-step movement of said movable member, each manually operative member at a step of said movable member moving an actuator into operative position.

12. A combination organ stop action provided with a movably mounted member provided with movably mounted actuators arranged in groups, manually operative members, means for operating said movably mounted member to present each group of actuators successively to said manually operative members, whereby on the movement of the latter an actuator in a group will be moved from inoperative to operative position.

13. A combination organ stop action comprising a movably mounted member provided with movably mounted actuators arranged in groups, manually operative members, means for operating said movably mounted member to present each group of actuators successively to said manually operative members, whereby on the movement of the latter an actuator in a group will be moved from inoperative to operative position, and means governed at will for moving those actuators which are in operative positions to inoperative positions.

14. A combination organ stop action comprising movably mounted numbers each having a plurality of movably mounted actuators arranged in groups, means for effecting the movement of each of said movably mounted members in steps and means for moving an actuator in a group from inoperative to operative position approximately at the conclusion of each step.

In testimony whereof I affix my signature in presence of two witnesses.

JOHN T. AUSTIN.

Witnesses:
T. MAY NORRIS,
HEATH SUTHERLAND.

Copies of this patent may be obtained for five cents each, by addressing the "Commissioner of Patents, Washington, D. C.